(12) United States Patent
Dawson et al.

(10) Patent No.: US 7,763,996 B2
(45) Date of Patent: Jul. 27, 2010

(54) METHOD AND APPARATUS FOR COOLING GENERATORS

(75) Inventors: Richard Nils Dawson, Voorheesville, NY (US); Samir Armando Salamah, Niskayuna, NY (US); Rebinth Jose Robin, Bangalore Karnataka (IN); Sandip Shahaji Hirade, Ahmednagar Maharashatra (IN)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 12/197,439

(22) Filed: Aug. 25, 2008

(65) Prior Publication Data

US 2008/0309176 A1 Dec. 18, 2008

Related U.S. Application Data

(63) Continuation-in-part of application No. 11/467,689, filed on Aug. 28, 2006, now Pat. No. 7,557,475.

(51) Int. Cl.
*H02K 9/00* (2006.01)

(52) U.S. Cl. .............................. 310/58; 310/53; 310/260

(58) Field of Classification Search ............. 310/52–59, 310/216, 260, 417, 428–429
See application file for complete search history.

(56) References Cited

U.S. PATENT DOCUMENTS

| | | | |
|---|---|---|---|
| 3,413,499 A * | 11/1968 | Barton | 310/58 |
| 3,969,643 A * | 7/1976 | Sapper | 310/53 |
| 4,039,872 A | 8/1977 | Armor et al. | |
| 4,051,400 A * | 9/1977 | Armor et al. | 310/58 |
| 4,324,993 A | 4/1982 | Sato et al. | |
| 4,465,947 A | 8/1984 | Armor et al. | |
| 4,609,840 A | 9/1986 | Eats et al. | |
| 4,682,064 A | 7/1987 | Crounse et al. | |
| 4,922,147 A | 5/1990 | Sismour, Jr. et al. | |
| 5,652,469 A * | 7/1997 | Boardman et al. | 310/58 |
| 5,939,805 A * | 8/1999 | Vanduyn | 310/58 |
| 6,268,668 B1 * | 7/2001 | Jarczynski et al. | 310/52 |
| 6,392,326 B1 | 5/2002 | Turnbull et al. | |
| 6,417,586 B1 | 7/2002 | Jarczynski et al. | |
| 6,452,294 B1 | 9/2002 | Vandervort et al. | |
| 6,465,917 B2 | 10/2002 | Wetzel et al. | |
| 6,504,273 B2 | 1/2003 | Tong | |
| 6,720,687 B2 | 4/2004 | Salamah et al. | |
| 6,727,610 B2 | 4/2004 | Ren et al. | |
| 6,798,079 B2 | 9/2004 | Nelson et al. | |

(Continued)

OTHER PUBLICATIONS

U.S. Appl. No. 11/467,689, Notice of Allowance and Fees Due dated Mar. 4, 2009.

(Continued)

*Primary Examiner*—Thanh Lam
(74) *Attorney, Agent, or Firm*—Hoffman Warnick LLC; Ernest G. Cusick

(57) ABSTRACT

A baffle for guiding cooling fluids in a power generator cooled by a cooling fluid and having a flange, a stator, and an end stator has an inclined surface configured to direct a first portion of the cooling fluid flow towards the flange, a second portion of the cooling fluid flow towards the end stator and a third portion of the first portion towards an angled surface of the flange.

15 Claims, 4 Drawing Sheets

U.S. PATENT DOCUMENTS

| | | |
|---|---|---|
| 7,071,586 B2 | 7/2006 | Hattori et al. |
| 2002/0158522 A1* | 10/2002 | Tong ........................... 310/58 |
| 2008/0048511 A1 | 2/2008 | Robin et al. |
| 2009/0072641 A1* | 3/2009 | Salamah et al. ............... 310/53 |

OTHER PUBLICATIONS

U.S. Appl. No. 11/467,689, Amendment to Office Action dated Sep. 25, 2008, filed Dec. 29, 2008.

U.S. Appl. No. 11/467,689, Office Action dated Sep. 25, 2008.

* cited by examiner

METHOD AND APPARATUS FOR COOLING GENERATORS

CROSS-REFERENCE TO RELATED APPLICATIONS

This application is a continuation-in-part of U.S. application Ser. No. 11/467,689, filed Aug. 28, 2006 now U.S. Pat. No. 7,557,475.

BACKGROUND OF THE INVENTION

The present invention relates to generator cooling and, more particularly, to a baffle plate for guiding cooling gas and improving end-core ventilation, to generators using such baffle plates, and to a method for generator cooling using such baffle plates.

During the process of producing electricity, power generators also create heat that must be dissipated away from the generator. Many known generators use fluid cooling to dissipate this heat. In many known generators, the fluid is a gas. Known gas-cooled generators are cooled by ventilated cooling systems that circulate the cooling gas through ducts in the rotor and stator.

In some known gas-cooled generators, a stator core is constructed by stacking many layers of magnetic laminations, also known as stator punchings. Ventilating ducts are defined between the stacked layers of magnetic laminations by providing spacers in the core stack, allowing for passage of cooling gas through the core during operation. The spacers are positioned in such a way to ensure tightness of the core during assembly and operation, and to avoid blocking or restricting the flow of gas through the stator. Outside space blocks are located at the ends of the generator stator core, between the stacked laminations and a stator flange 18. The cooling gas flow through the ventilation ducts between the stacked layers of laminations of the stator flows into a rotor-stator gap to define a rotor-stator gap flow.

As the ratings of conventional air-cooled generators increase, the challenge of cooling these generators also increases. Generator stator punchings are held together in the stator of a generator by stator flanges on either side. Heat is generated on these flanges as a result of electromagnetic fluxes from an end winding of the stator and axial fluxes from the core. Material considerations limit the maximum temperature of the flange. If proper cooling is not provided, insulation may fail, leading to malfunctioning of the generator. Thus, flange cooling may be required so that heat generated on the flange can be dissipated in a cooling medium. However, excessive flow through an outside space block (OSSB) may degrade overall performance of the generator and may cause reverse flow in outer stator ducts.

BRIEF DESCRIPTION OF THE INVENTION

In one aspect, some configurations of the present invention provide a baffle for guiding cooling fluids in a power generator cooled by a cooling fluid and having a flange, a stator, and an end stator. The baffle has an inclined surface configured to direct a first portion of the cooling fluid flow towards the flange and a second portion of the cooling fluid flow towards the end stator.

In another aspect, some configurations of the present invention provide a power generator having a cooling fluid flow. The power generator includes a flange, a stator having an end stator, and a baffle having an inclined surface configured to direct a first portion of the cooling fluid flow towards the flange and a second portion of the cooling fluid flow towards the end stator.

In yet another aspect, some configurations of the present invention provide a method for operating a power generator having a cooling fluid flow, a flange, a stator having an end stator, and an inclined baffle. The method includes directing a first portion of the cooling fluid flow towards the flange using the inclined baffle in the cooling fluid flow, and directing a second portion of the cooling fluid flow towards the end stator using the inclined baffle.

In another aspect, some configurations of the present invention provide an extended inclined baffle for guiding cooling fluids in a power generator cooled by a cooling fluid and having a flange, a stator, and an end stator. The baffle may include a first inclined surface configured to direct a first portion of the cooling fluid flow towards the flange and a second portion of the cooling fluid flow towards the end stator; and a second inclined surface configured to direct a third portion of the first portion of the cooling fluid flow towards an angled surface of the flange.

In yet another aspect, some configurations of the present invention provide a power generator having a cooling fluid flow. The power generator may include a flange; a stator having an end stator; and a baffle having a first inclined surface configured to direct a first portion of the cooling fluid flow towards the flange and a second portion of the cooling fluid flow towards the end stator, and a second inclined surface configured to direct a third portion of the first portion of the cooling fluid flow towards an angled surface of the flange.

In yet another aspect, some configurations of the present invention provide a method for operating a power generator having a cooling fluid flow, a flange, a stator having an end stator, and an inclined baffle. The method may include directing a first portion of the cooling fluid flow towards the flange using the inclined baffle in the cooling fluid flow; directing a second portion of the cooling fluid flow towards the end stator using the inclined baffle; and directing a third portion of the first portion of the cooling fluid flow towards an angled surface of the flange using the inclined baffle.

It will be appreciated that some configurations of the present invention can improve cooling of the flange and the stator core, resulting in better ventilation in generators, and particularly, reverse flow generators. The overall efficiency of the generator can also increase, as the efficiency is a function of ventilation efficiency. As a result, the cost of electricity may be reduced for end users.

DETAILED DESCRIPTION OF THE INVENTION

As used herein, an element or step recited in the singular and proceeded with the word "a" or "an" should be understood as not excluding plural elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
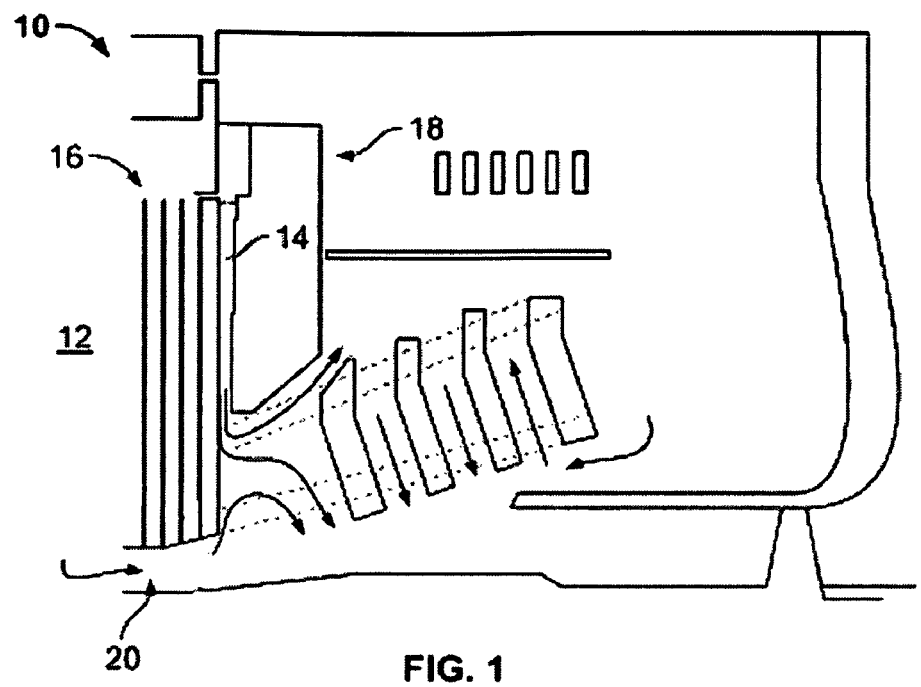
FIG. 1 is a schematic cross-sectional view showing the conventional air flow distribution in the end core of a prior art air-cooled generator design.

In some prior art configurations and referring to FIG. 1, a rotor is generally shown at 10. The generator stator core 12 is constructed by stacking many layers of magnetic laminations. Ventilation ducts are defined between the stacked layers of magnetic laminations by providing spacers in the core stack, allowing for passage of cooling gas through the core during operation. These spacers are positioned in such a way to ensure tightness of the core during assembly and operation, but must not block or restrict the flow of gas through the stator. Outside space blocks 14 are located at ends of the generator stator core, between stacked laminations 16 and stator flange 18, schematically shown by dashed lines next to flange 18.

Figure 2:
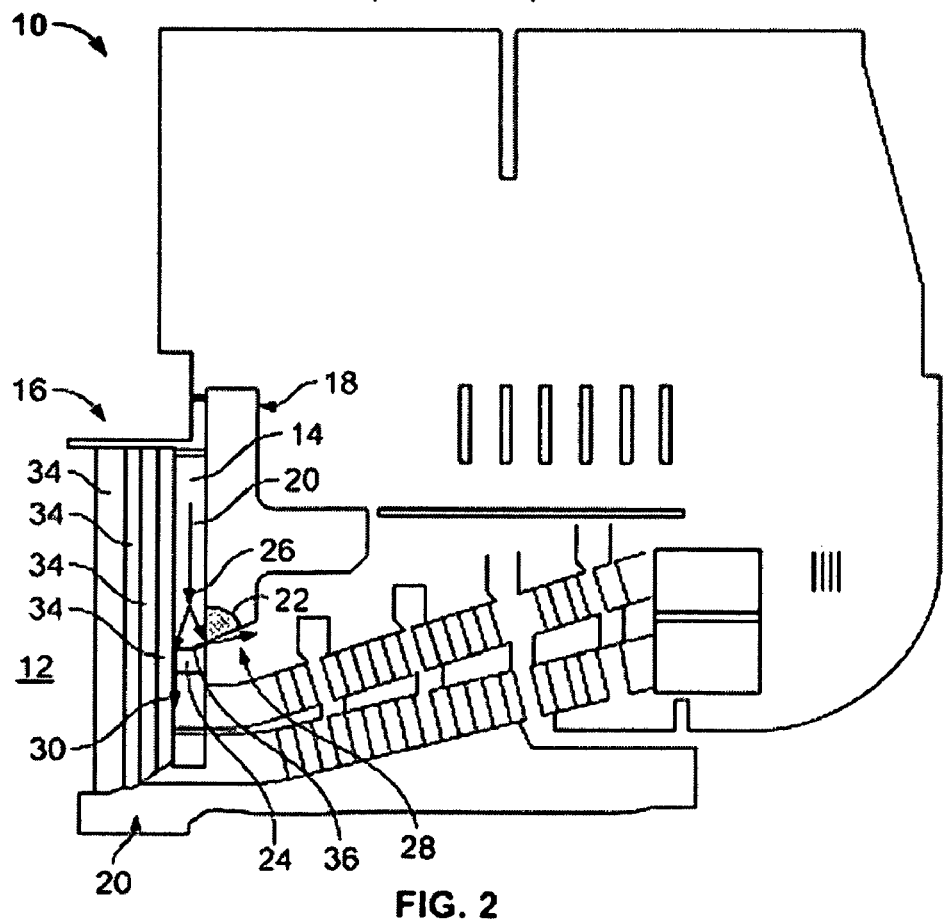
FIG. 2 is a schematic cross-sectional view showing an air flow distribution at the generator end-core region when a baffle is mounted to the flange in an embodiment of the present invention.
Figure 3:
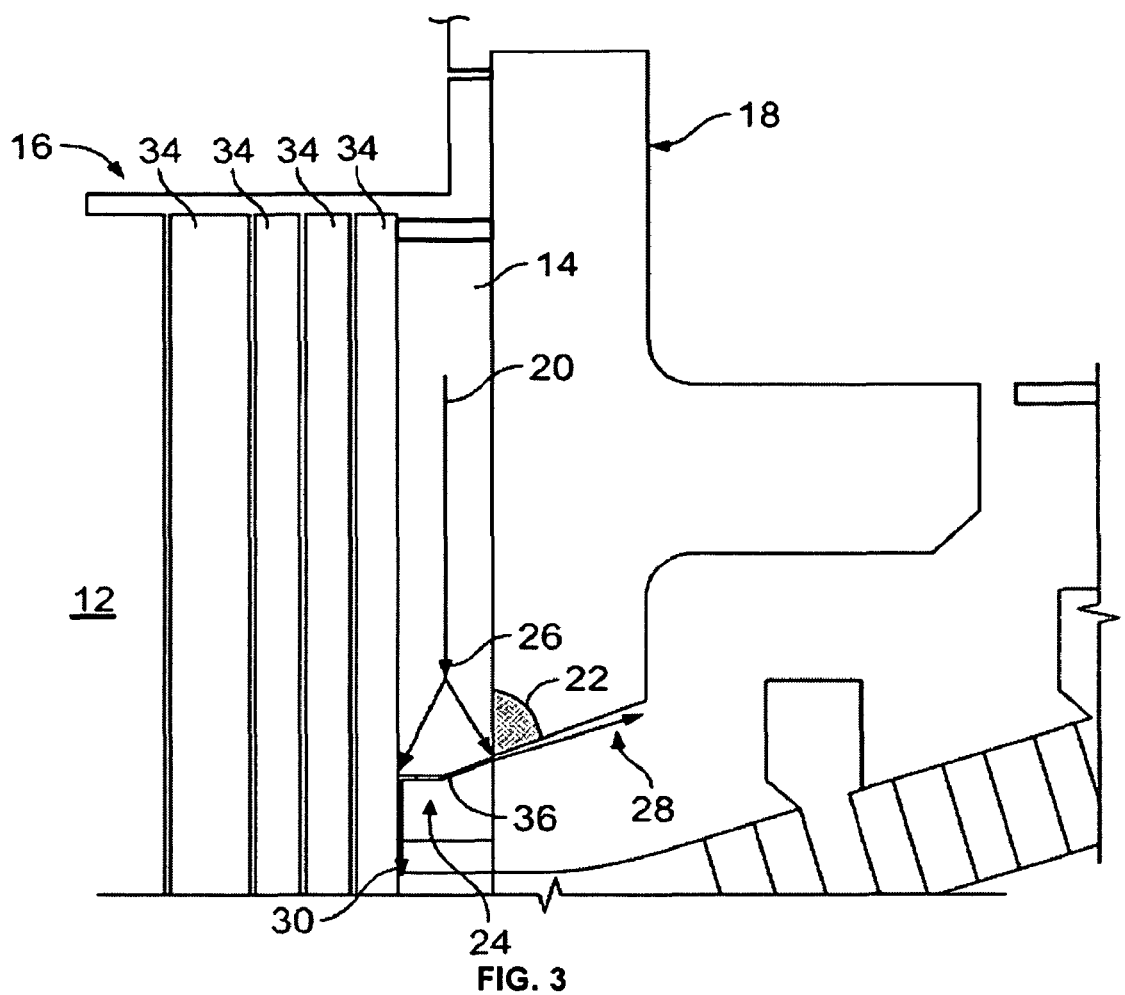
FIG. 3 is a close-up view of a portion of FIG. 2.

Referring to FIGS. 2 and 3, when electromagnetic flux from a stator end winding (not shown in the Figures) and axial flux from a stator core 12 impinge on a stator flange 18, these fluxes generate a significant amount of heat on the surface of flange 18. The cooling medium 20 on a reverse flow generator 10 passes through the outside space blocks (OSSB) 14 between end stator 16 punching and stator flange 18. The flow of cooling medium 20 cools both end stator 16 and stator flange 18 before mixing with other flows and exiting through the fan. A hot spot 22 (best seen in FIG. 3) on a flange 18 may occur on its inner radius surface closest to the stator winding. To avoid having a hot spot 22, some configurations of the present invention include the addition of an inclined baffle 24 in the flow path through OSSB 14 that deflects a first part 28 of cooling fluid flow 26 towards hot spot 22 on flange 18 and a second part 30 of cooling fluid flow 26 towards end stator 16. Inclined baffle 24 also controls the amount of cooling fluid flow 26 through OSSB 14 to ensure that cooling fluid flow 26 does not reverse in radial ducts 34 of the stator punching.

Thus, a configuration of the present invention provides a baffle 24 for guiding cooling fluids 20 in a power generator 10 cooled by a cooling fluid 20 and having a flange 18, a stator 12, and an end stator 16. Baffle 24 has an inclined surface 36 configured to direct a first portion 28 of cooling fluid flow 26 towards flange 18 and a second portion 30 of cooling fluid flow 26 towards end stator 16. In some of these configurations, power generator 10 further includes an outside space block (OSSB) 14 and stator 12 has a plurality of radial ducts 34, and baffle 24 is further configured to control an amount of the flow 26 of cooling fluid 20 through OSSB 14. Also, in some of these configurations, baffle 24 is further configured to prevent reverse flow of cooling fluid 20 in the radial ducts 34 of the stator. Baffle 24 in some configurations is installed in a reverse flow generator 10.

Also, some configurations of the present invention provide a power generator 10 having a cooling fluid flow 26 and further comprising a flange 18, a stator 12 having an end 16, and a baffle 24 having an inclined surface 36 configured to direct a first portion 28 of cooling fluid flow 26 towards flange 18 and a second portion 30 of cooling fluid flow 26 towards end stator 16. In some of these configurations, stator 12 has a plurality of radial ducts 34, power generator 10 further comprises an outside space block (OSSB) 14, and baffle 24 is further configured to control an amount of the flow 26 of cooling fluid 20 through OSSB 14. Also, in some configurations, baffle 24 is further configured to prevent reverse flow of cooling fluid 20 in radial ducts 34 of stator 12. In some configurations, power generator 10 is a reverse flow generator.

In some configurations of the present invention, a method for operating a power generator 10 having a cooling fluid flow 26, a flange 18, a stator 12 having an end 16, and a baffle 24 is provided. The method includes directing a first portion 28 of cooling fluid flow 26 towards flange 18 using the inclined baffle 24 in the cooling fluid flow, and directing a second portion 30 of cooling fluid flow 26 towards end stator 16 using inclined baffle 24. In some of these configurations, directing first portion 28 of cooling fluid flow 26 includes directing first portion 28 of cooling fluid flow 26 towards a hot spot 22 on flange 18. Also in some of these configurations, stator 12 has a plurality of radial ducts 34, power generator 10 further comprises an outside space block (OSSB) 14, and the method further includes using baffle 24 to control an amount of flow 26 of cooling fluid 20 through OSSB 14. Also, in some configurations, using baffle 24 to control an amount of flow 26 of cooling fluid 20 through OSSB 14 includes preventing reverse flow of cooling fluid 20 in radial ducts 34 of stator 12. In some of the method configurations, power generator 10 is a reverse flow generator.

A conjugate CFD model was created to simulate thermal and flow phenomenon in the stator end winding region. A model configuration of the present invention was checked against a baseline for enhancement in flow and thermal parameters inside the domain. The addition of an inclined baffle resulted in a hot spot temperature reduction on the flange of about at least 30 degrees Celsius.

Figure 4:
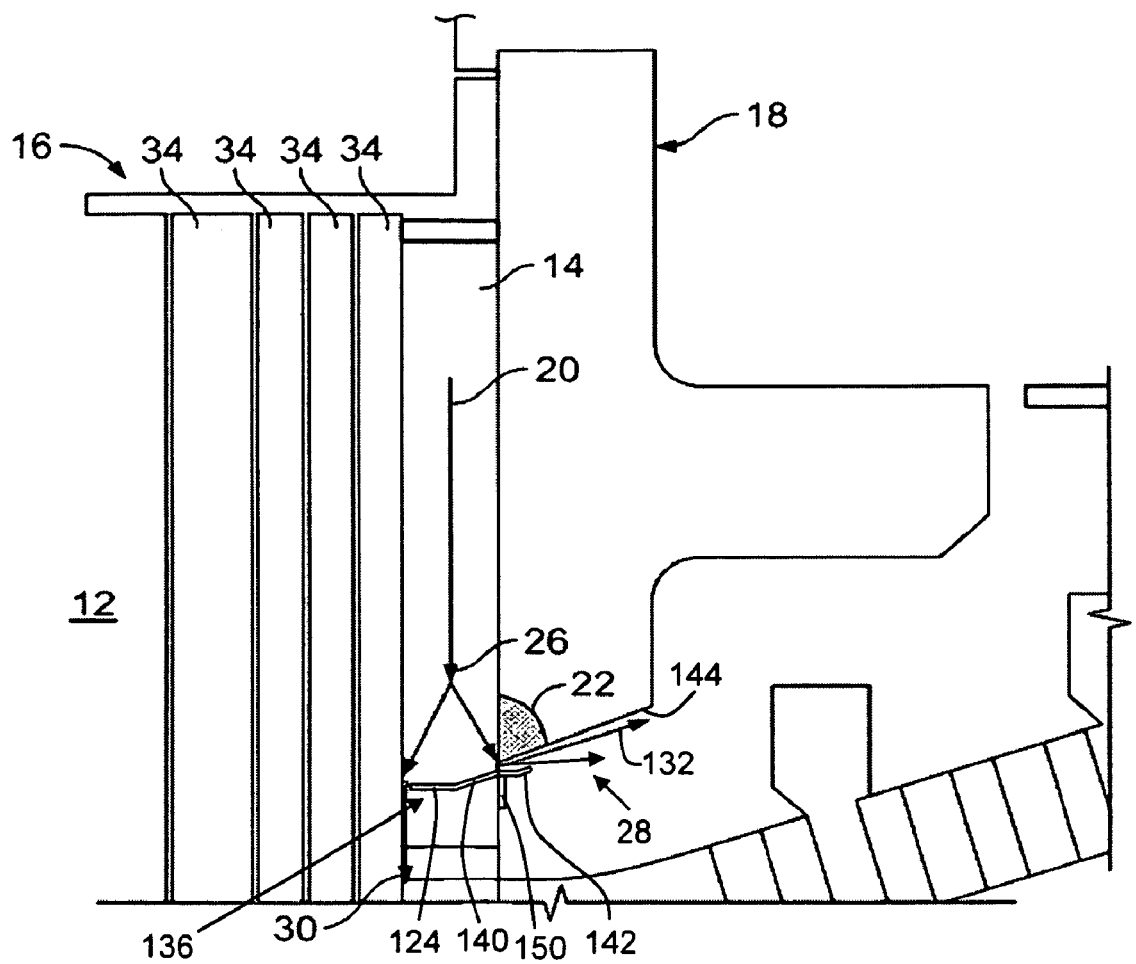
FIG. 4 is a close-up view of an alternative embodiment to that of FIGS. 2-3.
Figure 5:
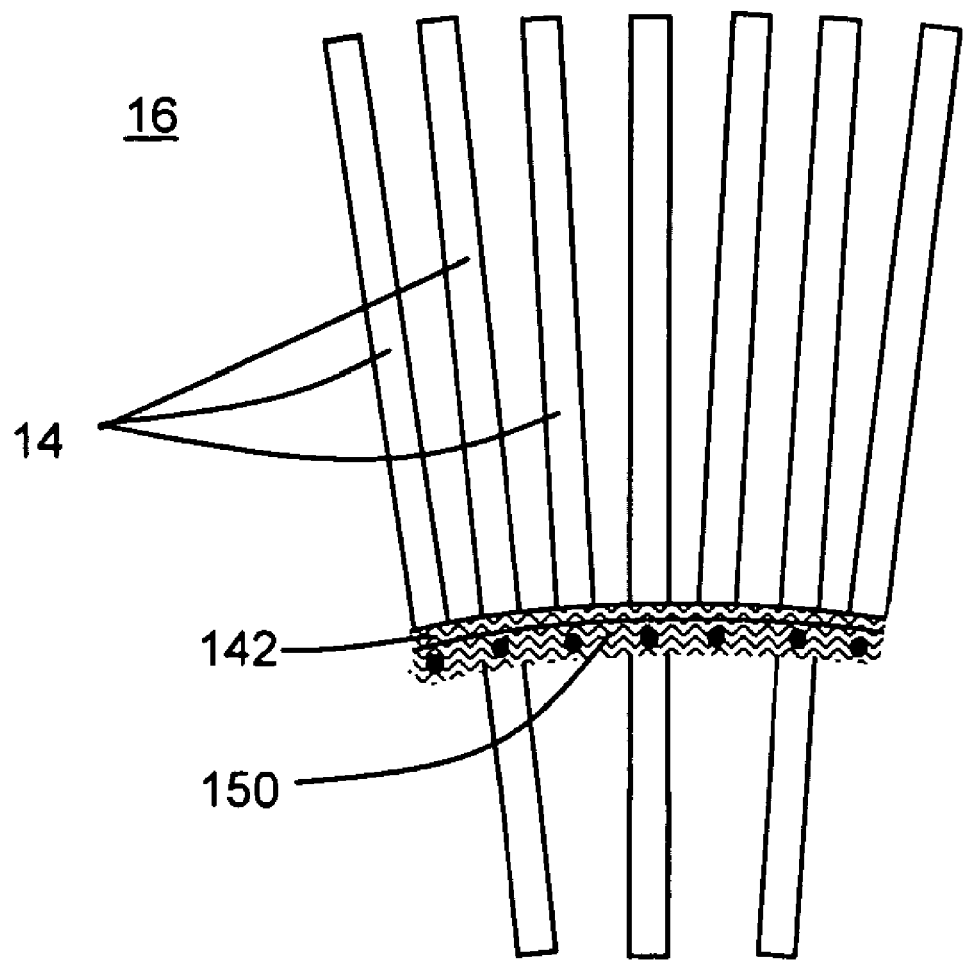
FIG. 5 is a partial view of the alternative embodiment of FIG. 4.

Referring to FIG. 4, to avoid having a hot spot 22, some configurations of the present invention include the addition of an extended inclined baffle 124 in the flow path through OSSB 14 that deflects a first part 28 of cooling fluid flow 26 towards hot spot 22 on flange 18 and a second part 30 of cooling fluid flow 26 towards end stator 16. More specifically, in contrast to baffle 24 (FIGS. 2-3), extended inclined baffle 124 includes a first inclined surface 140 configured to direct first portion 28 of cooling fluid flow 26 towards flange 18 and second portion 30 of cooling fluid flow 26 towards end stator 16. In addition, extended inclined baffle 124 also includes a second inclined surface 142 configured to direct a third portion 132 of first portion 28 of cooling fluid flow 26 towards an angled surface 144 of flange 18. Extended inclined baffle 124 also controls the amount of cooling fluid flow 26 through OSSB 14 to ensure that cooling fluid flow 26 does not reverse in radial ducts 34 of the stator punching. Baffle 124 may include a mount 150 for securing the baffle 124 to a surface of OSSB 14, e.g., where OSSB 14 extends beyond the inner diameter of flange 18. Flange 124 may be positioned between each OSSB 14 or selective OSSBs 14. As shown in the partial view of FIG. 5 (flange 18 removed), mount 150 may be a curved fixture for mounting a specified number of baffles 124. In an alternative embodiment, mount 150 may be one-piece circular fixture. This latter configuration, however, does not require a baffle 124 between each OSSB 14.

Thus, some configurations of the present invention provide a baffle 124 for guiding cooling fluids 20 in a power generator 10 cooled by a cooling fluid 20 and having a flange 18, a stator 12, and an end stator 16. Baffle 124 has a first inclined surface 140 configured to direct first portion 28 of cooling fluid flow 26 towards flange 18 and second portion 30 of cooling fluid flow 26 towards end stator 16. Further, baffle 124 includes second inclined surface 142 configured to direct third portion 132 of first portion 28 of cooling fluid flow 26 towards an angled surface 144 of flange 18. In some of these configurations, power generator 10 further includes an outside space block (OSSB) 14 and stator 12 has a plurality of radial ducts 34, and baffle 124 is further configured to control an amount of cooling fluid flow 26 of cooling fluid 20 through OSSB 14. Also, in some of these configurations, baffle 124 is further configured to prevent reverse flow of cooling fluid 20 in the radial ducts 34 of the stator. Baffle 124 in some configurations is installed in a reverse flow generator 10.

Also, some configurations of the present invention provide a power generator 10 having a cooling fluid flow 26 and further comprising a flange 18, a stator 12 having an end 16, and baffle 124 having first inclined surface 140 configured to direct first portion 28 of cooling fluid flow 26 towards flange 18 and second portion 30 of cooling fluid flow 26 towards end stator 16. In addition, baffle 124 also includes second inclined surface 142 configured to direct third portion 132 of first portion 28 of cooling fluid flow 26 towards angled surface 144 of flange 18. In some of these configurations, stator 12 has a plurality of radial ducts 34, power generator 10 further comprises an outside space block (OSSB) 14, and baffle 124 is further configured to control an amount of the flow 26 of cooling fluid 20 through OSSB 14. Also, in some configurations, baffle 124 is further configured to prevent reverse flow of cooling fluid 20 in radial ducts 34 of stator 12. In some configurations, power generator 10 is a reverse flow generator.

In some configurations of the present invention, a method for operating a power generator 10 having a cooling fluid flow 26, a flange 18, a stator 12 having an end 16, and a baffle 124 is provided. The method includes directing a first portion 28 of cooling fluid flow 26 towards flange 18 using baffle 124 in the cooling fluid flow, directing second portion 30 of cooling fluid flow 26 towards end stator 16 using inclined baffle 124, and directing third portion 132 of first portion 28 of cooling fluid flow 26 towards an angled surface 144 of flange 16 using inclined baffle 124. In some of these configurations, directing first portion 28 of cooling fluid flow 26 includes directing first portion 28 of cooling fluid flow 26 towards a hot spot 22 on flange 18. Also in some of these configurations, stator 12 has a plurality of radial ducts 34, power generator 10 further comprises an outside space block (OSSB) 14, and the method further includes using baffle 124 to control an amount of flow 26 of cooling fluid 20 through OSSB 14. Also, in some configurations, using baffle 124 to control an amount of flow 26 of cooling fluid 20 through OSSB 14 includes preventing reverse flow of cooling fluid 20 in radial ducts 34 of stator 12. In some of the method configurations, power generator 10 is a reverse flow generator.

A conjugate CFD model was created to stimulate thermal and flow phenomenon in the stator end winding region of the FIG. 4 configuration. A model configuration of the present invention was checked against a baseline for enhancement in flow and thermal parameters inside the domain. The addition of inclined baffle 124 resulted in a hot spot temperature reduction on the flange of 43 degrees Celsius.

It will thus be appreciated that some configurations of the present invention provide can be to improve cooling of the flange and the stator core, resulting in better ventilation in generators, and particularly, reverse flow generators. The overall efficiency of the generator can also increase, as the efficiency is a function of ventilation efficiency. As a result, the cost of electricity may be reduced for end users.

While the invention has been described in terms of various specific embodiments, those skilled in the art will recognize that the invention can be practiced with modification within the spirit and scope of the claims.

What is claimed is:

1. A baffle for guiding cooling fluids in a power generator cooled by a cooling fluid and having a flange, a stator, and an end stator, the baffle comprising:
   a first inclined surface configured to direct a first portion of the cooling fluid flow towards the flange and a second portion of the cooling fluid flow towards the end stator; and
   a second inclined surface configured to direct a third portion of the first portion of the cooling fluid flow towards an angled surface of the flange.

2. A baffle in accordance with claim 1, wherein the power generator further includes an outside space block (OSSB) and the stator has a plurality of radial ducts; and
   the baffle is further configured to control an amount of the flow of cooling fluid through a radial duct.

3. A baffle in accordance with claim 2, further configured to prevent reverse flow of cooling fluid in the radial ducts of the stator.

4. A baffle in accordance with claim 2, further comprising a mount for coupling the baffle to a surface of the OSSB.

5. A baffle in accordance with claim 1 in a reverse flow generator.

6. A power generator having a cooling fluid flow and further comprising:
   a flange;
   a stator having an end stator; and
   a baffle having a first inclined surface configured to direct a first portion of the cooling fluid flow towards the flange and a second portion of the cooling fluid flow towards the end stator, and a second inclined surface configured to direct a third portion of the first portion of the cooling fluid flow towards an angled surface of the flange.

7. A power generator in accordance with claim 6, wherein the stator has a plurality of radial ducts, the power generator further comprising an outside space block (OSSB), and the baffle is further configured to control an amount of the flow of cooling fluid through the OSSB.

8. A power generator in accordance with claim 7, further comprising a mount for coupling the baffle to a surface of the OSSB.

9. A power generator in accordance with claim 7, wherein the baffle is further configured to prevent reverse flow of cooling fluid in the radial ducts of the stator.

10. A power generator in accordance with claim 7 in a reverse flow generator.

11. A method for operating a power generator having a cooling fluid flow, a flange, a stator having an end stator, and an inclined baffle, the method comprising:
    directing a first portion of the cooling fluid flow towards the flange using the inclined baffle in the cooling fluid flow;
    directing a second portion of the cooling fluid flow towards the end stator using the inclined baffle; and
    directing a third portion of the first portion of the cooling fluid flow towards an angled surface of the flange using the inclined baffle.

12. A method in accordance with claim 11, wherein the directing the first portion of the cooling fluid flow comprises directing the first portion of the cooling fluid flow towards a hot spot on the flange.

13. A method in accordance with claim 11, wherein the stator has a plurality of radial ducts, the power generator further comprising an outside space block (OSSB), and the method further includes using the baffle to control an amount of the flow of cooling fluid through the OSSB.

14. A method in accordance with claim 13, wherein the using the baffle to control an amount of the flow of cooling fluid through the OSSB includes preventing reverse flow of cooling fluid in the radial ducts of the stator.

15. A method in accordance with claim 11, wherein the power generator is a reverse flow generator.

* * * * *